(12) United States Patent
Bürklin et al.

(10) Patent No.: US 7,570,598 B2
(45) Date of Patent: Aug. 4, 2009

(54) COMMUNICATION DEVICES CAPABLE OF WIRELESS INTERFACING AND METHODS FOR ASSOCIATING SAID DEVICES

(75) Inventors: Helmut Bürklin, Rennes (FR); Gilles Straub, Acigné (FR); Sébastien Perrot, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 701 days.

(21) Appl. No.: 10/488,584

(22) PCT Filed: Sep. 3, 2002

(86) PCT No.: PCT/FR02/02995
§ 371 (c)(1),
(2), (4) Date: Mar. 4, 2004

(87) PCT Pub. No.: WO03/026223
PCT Pub. Date: Mar. 27, 2003

(65) Prior Publication Data
US 2004/0242223 A1 Dec. 2, 2004

(30) Foreign Application Priority Data
Sep. 4, 2001 (FR) .................................. 01 11401

(51) Int. Cl.
*H04L 12/26* (2006.01)
*H04L 12/28* (2006.01)
*H04W 4/00* (2006.01)
(52) U.S. Cl. .................. 370/252; 370/254; 370/338
(58) Field of Classification Search .............. 370/457, 370/252, 254, 338
See application file for complete search history.

(56) References Cited

U.S. PATENT DOCUMENTS

| | | | | |
|---|---|---|---|---|
| 5,490,139 A | * | 2/1996 | Baker et al. | 370/401 |
| 6,084,867 A | * | 7/2000 | Meier | 370/402 |
| 6,163,703 A | | 12/2000 | Lee | 455/462 |
| 6,272,120 B1 | * | 8/2001 | Alexander | 370/338 |
| 6,445,691 B2 | * | 9/2002 | Sato | 370/401 |
| 6,678,502 B1 | * | 1/2004 | Sugaya et al. | 455/74.1 |
| 6,683,865 B1 | * | 1/2004 | Garcia-Luna-Aceves et al. | 370/401 |
| 6,728,244 B1 | * | 4/2004 | Takabatake | 370/392 |

(Continued)

FOREIGN PATENT DOCUMENTS

WO 01/22661 3/2001

OTHER PUBLICATIONS

ETSI: "Broadband Radio Access Networks (FRAN) ; HIPERLAN Type 2; Packet based Convergence Layer; Part 4: IEEE 1394 Bridge Specific Functions sub-layer for restricted topology" ETSI TS 101 493-4 V1.1.1 Jul. 2001, pp. 1-19.

(Continued)

*Primary Examiner*—Steven H Nguyen
(74) *Attorney, Agent, or Firm*—Robert D. Shedd; Joseph J. Opalach; Reitseng Lin

(57) ABSTRACT

A method and device for implementing a method for associating communication devices capable of wireless interfacing. The method includes producing a relation between communication devices capable of wireless interfacing enabling dialogue among them exclusively. The devices comprise a single and permanent identifier, can be connected to a cable network and exchange data through the latter. The association can be modified by connecting the devices to be associated to a single cable network.

19 Claims, 7 Drawing Sheets

U.S. PATENT DOCUMENTS

| | | | |
|---|---|---|---|
| 6,836,463 B2 * | 12/2004 | Garcia-Luna-Aceves et al. | 370/338 |
| 6,992,996 B2 * | 1/2006 | Sugaya | 370/328 |
| 7,020,725 B2 * | 3/2006 | Burdin et al. | 710/200 |
| 7,130,904 B2 * | 10/2006 | Kitchin | 709/225 |
| 7,158,483 B1 * | 1/2007 | Takabatake et al. | 370/254 |
| 7,188,165 B1 * | 3/2007 | Baker et al. | 709/222 |
| 2007/0121529 A1 * | 5/2007 | Meier | 370/256 |

OTHER PUBLICATIONS

Search report dated Jan. 9, 2003.

* cited by examiner

COMMUNICATION DEVICES CAPABLE OF WIRELESS INTERFACING AND METHODS FOR ASSOCIATING SAID DEVICES

This application claims the benefit, under 35 U.S.C. § 365 of International Application PCT/FR02/02995, filed Sep. 3, 2002, which was published in accordance with PCT Article 21(2) on Mar. 27, 2003 in French and which claims the benefit of French patent application No. 0111401, filed Sep. 4, 2001.

BACKGROUND OF THE INVENTION

The present invention concerns communication networks, more particularly devices capable of wireless dialog connected to these networks and methods of associating said devices.

There is currently an effort to define standards for linking communication buses by using a wireless communication technology. Parallel efforts have been made under the patronage on the one hand of the IEEE (IEEE P1394.1 "Draft Standard for High performance Serial Bus Bridges") and, on the other hand, by the ETSI ("Broadband Radio Access Network (BRAN); HIPERLAN Type 2 Technical Specification; Packet based convergence layer").

European patent application EP 01114694.1 filed on Jun. 19, 2001 by the Applicant describes a process of linking several communication buses using wireless communication networks or radio networks. This application describes communication devices capable of wireless dialog or radio devices called "wireless boxes" which perform the portal function between a wired IEEE 1394 network and a Hiperlan 2 wireless communication network. One of the features of these devices is their operation in pairs. In effect, a given radio device can communicate wirelessly only with one other radio device designated as its associate; for this, each radio device knows an identifier specific to its associate which enables it to distinguish the latter from all the others. In European patent application EP 01114694.1, the identifier specific to each radio device is a static address called EUI-64 stored permanently in read-accessible memory by any other peripheral required by the document "IEEE 1394-1995 Standard for a High Performance Serial Bus".

The simplest way of implementing this association of two radio devices is "by construction" during fabrication, each device receives a unique identification number (for example the EUI-64 address). At the same time, each device receives the identification number of its associate (it is retained in a memory such as a flash memory for example). The two radio devices will be capable of interchanging these numbers using their wireless communication protocols and thus be able to carry out wireless communications exclusively with their associate.

This procedure however has some disadvantages:
- the two associates can never be separated; they cannot be used one without the other (the problem arises, for example, at the time of a repair or of the destruction of one of the two devices);
- if one and the same user possesses two pairs of radio devices, he must then mark each of them differently in order to differentiate them when the network is completely reinstalled.

One aim of the invention is to propose a communication device capable of wireless dialog comprising:
- means of wireless communication with other communication devices capable of wireless dialog designated as being its associates;
- means for communicating with the devices connected to a wired network;

and characterized in that it comprises:
- means for establishing a modifiable association with other communication devices capable of wireless dialog.

In what follows, use will be made of the term "radio device" already explained previously to designate such devices.

Another aim of the invention is to propose a modifiable method of associating radio devices as described above, making it possible, in the event of separation of the initially associated devices, to create a new association with any other device of the same type as the one previously described. This method of association also makes it possible to modify an initial association of a radio device with no radio device, this gives a first association to the device. Initially, this method can be applied to two devices only.

Thus, the present invention concerns a method of associating radio devices as described above, characterized in that this association is modifiable by connecting at least two of the radio devices to be associated.

SUMMARY OF THE INVENTION

According to a refinement, the method of associating two radio devices is extended to n devices with n being greater than or equal to three.

According to an embodiment of the present invention, the methods of associating two or n devices are achieved by communication over a physical link between the devices to be associated.

According to a variant of the preceding refinement, the n devices to be associated must be interlinked physically, that is a wired link must exist between them, and must not be capable of entering into wireless communication with any of their former associates (except if these latter are present on the bus). According to another variant of the above refinement, a radio device not capable of entering into wireless communication with any of its former associates is physically linked to a radio device capable or not of entering into wireless communication with its former associates.

BRIEF DESCRIPTION OF THE DRAWINGS

Other features and advantages of the present invention will be revealed on reading the description of various embodiments, this description being offered with reference to the drawings attached hereto wherein.

DETAILED DESCRIPTION OF THE PREFERRED EMBODIMENT

In the rest of the description, it has been decided to interlink the various devices via an IEEE 1394 type serial bus and via a wireless communication network of the Hiperlan 2 type. The various technologies used to illustrate the following embodiments are not exclusive, others may be used. Similarly, the EUI-64 address, the unique and permanent identifier used to distinguish the devices, is not the only one possible. The memory serial number for example can be used in its place.

Figure 1A:
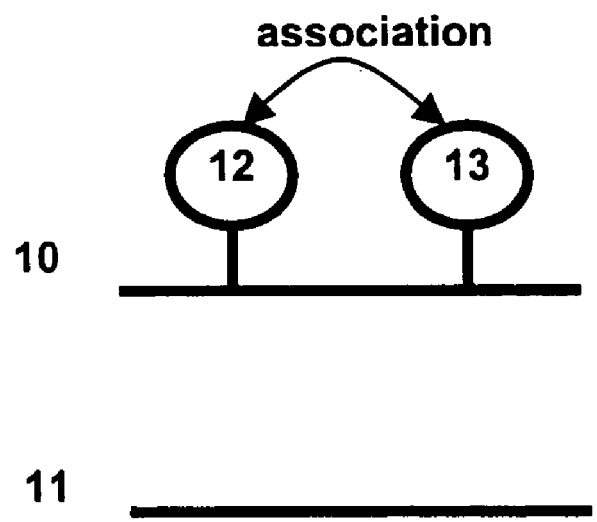
FIG. 1 is a diagram illustrating the association of two radio devices.
Figure 1B:
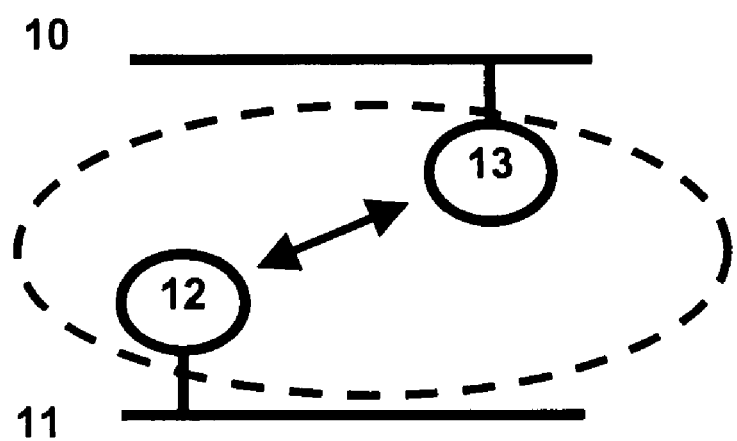

There follows a description of a method used to associate two or more radio devices by connecting them to a single wired bus. It is clear that, once the association has been made, all the radio devices except one are disconnected from the initial bus to be connected to other buses intended to form a network with the initial bus. This is illustrated in FIG. 1a which shows the association of two radio devices 12 and 13 connected to one and the same bus 11; in FIG. 1b, the radio device 12 is disconnected from the bus 11 to be connected to the bus 10 in order to form a network consisting of two buses (10 and 11) linked by a bridge formed by the two radio devices 12 and 13.

For the exemplary embodiment, the EUI-64 address has been chosen as the identifier of any device. Each radio device may include an original association initialized on fabrication of the device. It has been decided, for example, that the original associate of each radio device is the one with the EUI-64 address immediately following its own (the radio device 0 is associated with the 1, the 2 with the 3, etc.). To determine the value of the original associate, it is sufficient to make an exclusive OR between the EUI-64 address of the radio device and the digit 1 encoded on 64 bits. This initial association enables the user to be able to use the devices immediately without special manipulation. Otherwise, the initial association can be left blank, that is no associate is allocated to a radio device during its fabrication and the user is told that he must make the first association of the device himself in order to use the radio device. However, the fact that the device possesses an initial association or a blank initial association (it is not initially associated) does not modify the process of association because when he seeks to communicate with the peripherals with which he should be associated, he will simply not try to communicate. In the rest of the description, the method of associating only two devices will be shown initially. Two variants for associating a number n of radio devices (n being an integer greater than two) will then be studied.

Figure 2:
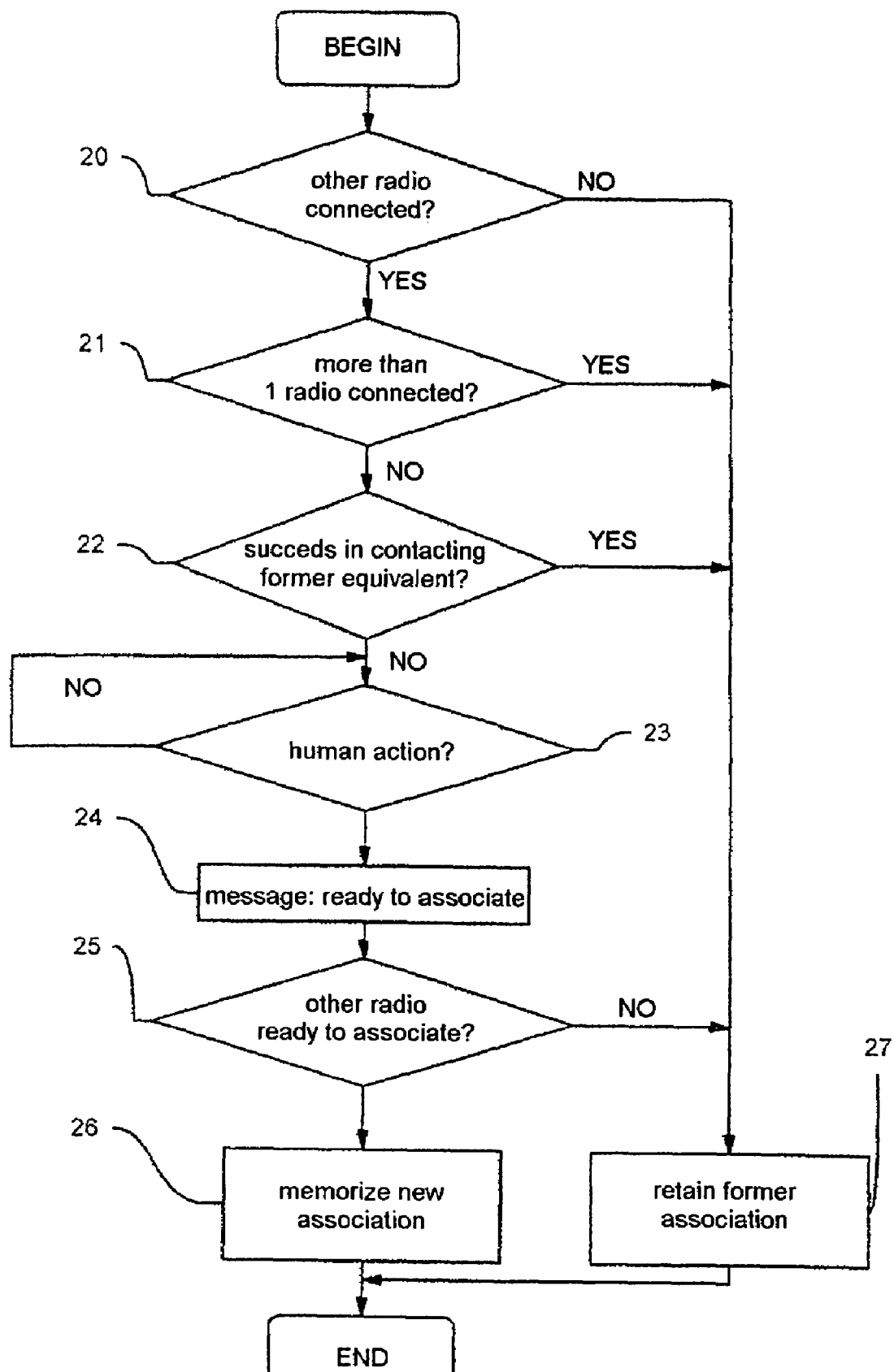
FIG. 2 is a flowchart exhibiting the procedure of associating two radio devices.

There now follows a description with reference to FIG. 2 of an embodiment of the method of associating two radio devices. The two radio devices to be associated are connected to one and the same 1394 bus. Each new connection to the bus provokes a reinitialization of the bus called "bus reset" as defined in the document "IEEE 1394-1995 Standard for a High Performance Serial Bus". The method is described for a given radio device. The radio device in question explores the bus to find other radio devices. It is considered, for example, that each device possesses a specific register to indicate to the other devices whether it is a radio device. If it finds none (20), it retains its former association (27), which is either the initial association previously described or the association that it possessed before the beginning of the method and abandons the association process. If it finds more than one (21), it then also retains its former association (27) because the method described in FIG. 2 allows association between two radio devices only. Where appropriate, if it finds another device which is not a radio device, then it retains its former association and abandons the association process because it can be considered that, to associate two radio devices, it is necessary to connect them to a bus that has no other connection, but this criterion is not mandatory because the presence of other non-radio devices on the bus does not prevent the method from proceeding. If it finds only one other radio device, it then tries to achieve wireless communication with its former associate (22). If it succeeds in this, it then retains its former association (27) and abandons the process of association because, in this case, there is no ground for creating a new association since the former association is still valid. The meaning of the expression valid association is the fact that the associates designated by that association are capable of wireless communication with one another when an attempt is made to use that association. In fact, the associates are all powered up and are close enough to be capable of wireless communication. Before continuing the process of association, the radio devices may wait for a non-mandatory human intervention (23). It may be considered that the creation of any new association must be validated by the network administrator. An example of human intervention may, for example, be considered to be the pressing of a button situated on the radio device or any other enabling means. However, this human intervention is not mandatory. If the two radio devices do not succeed in reaching their respective former associate, they then continue the process of association. Over the wired network, they interchange their respective EUI-64 addresses and an indication on the fact that each of them has succeeded or otherwise in communicating with its former associate (24 and 25) hence whether or not they are ready to continue the protocol of association. If the two radio devices indicate that they are ready to continue the protocol of association, then each one enters the number of the other in memory (26) (in a modifiable memory, for example a non-volatile but modifiable flash memory) so as to be able to subsequently dialog without contact. Otherwise, they interrupt the protocol of association.

According to the present exemplary embodiment described above, the joint use of particular devices and of the method of association makes it possible to form a new association of two radio devices. The original association can then be modified, replaced by a new one which is itself modifiable. Thus initially associated radio devices can be separated, so that each radio device is usable on its own and is no longer dependent on its initial associate.

Furthermore it can be considered that to be able to associate two radio devices, it is necessary to connect them together without an intermediary in order to be able to form the association, the fact of interconnecting two devices creating a wired network. For the rest, this variant uses a method similar to that described above.

According to one embodiment, the method is extended to n devices where n is greater than or equal to three. It may indeed be useful to be able to associate more than two radio devices to form wireless links between more than two buses. The method previously explained must therefore be modified to adapt it to the possibility that one and the same device may have several associates. For this second example, two variants are envisaged. The first consists in connecting all the radio devices to be associated to one and the same IEEE 1394 type bus and in associating them with one another under certain conditions. The second variant consists in fact in adding under certain conditions a new radio device to a set of radio devices already associated with one another. In this latter variant, only the radio device to be added and one of the radio devices of the previous set must be connected to the same bus.

Figure 3:
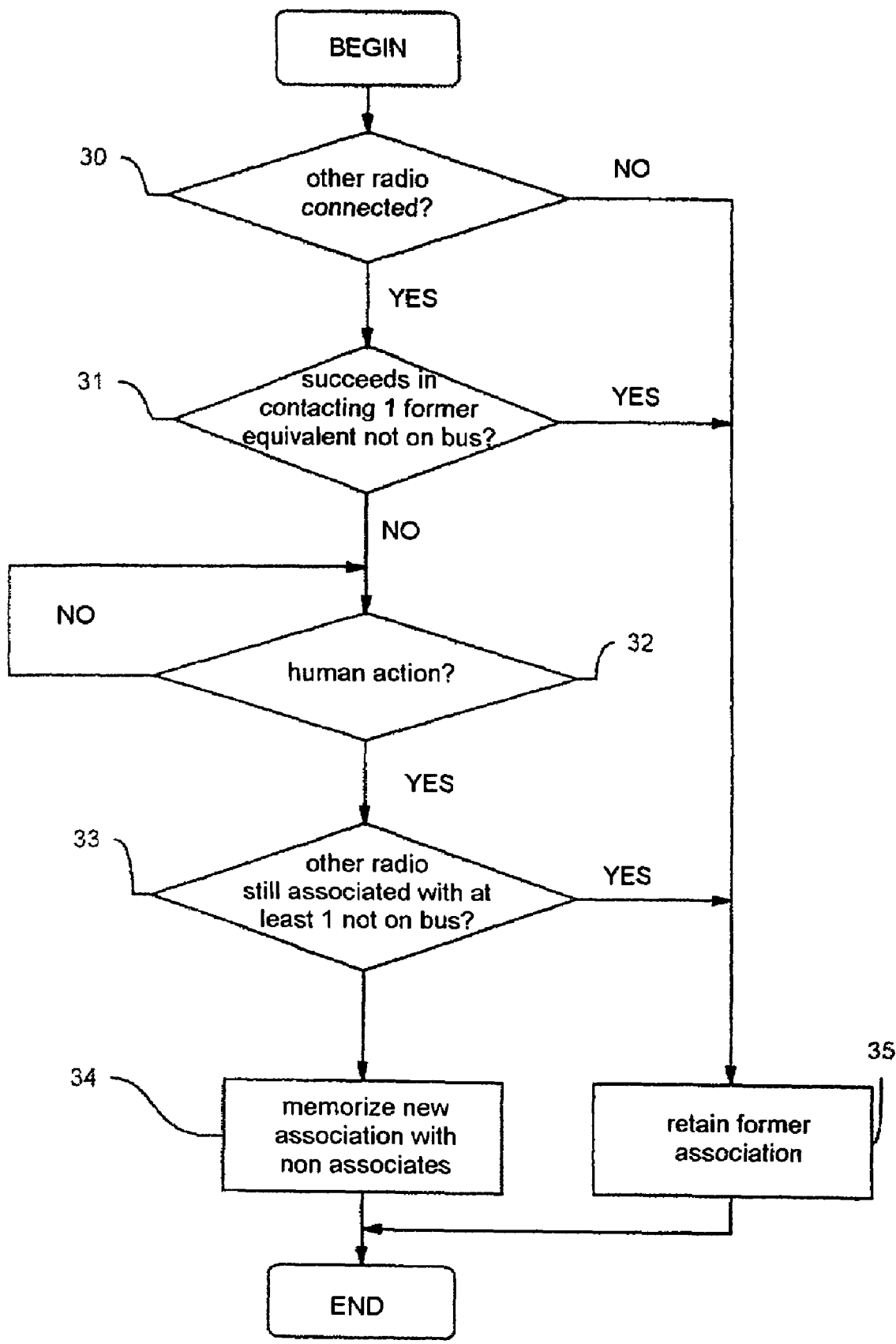
FIG. 3 is a flowchart exhibiting the procedure of associating several radio devices by connecting them all to one and the same bus.
Figure 4:
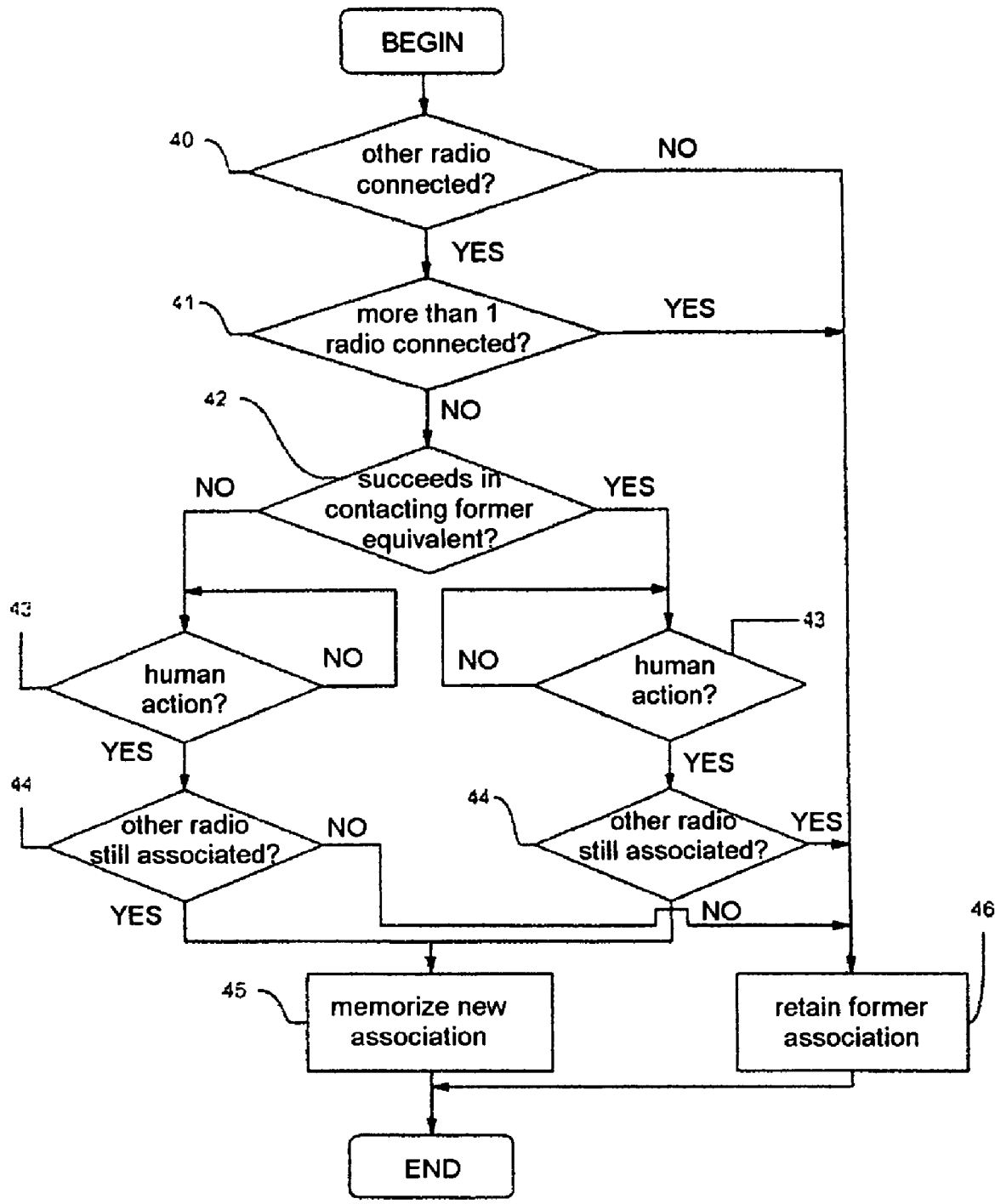
FIG. 4 is a flowchart exhibiting the procedure of associating one radio device with a set of already associated radio devices.

The first variant of the enhancement consists, as is shown in FIG. 3, in connecting all the radio devices to be associated to one and the same bus. The method previously described for two radio devices must be modified to adapt it to a number of associated radio devices greater than or equal to three. The main condition of implementation of the association process is that no radio device to be associated must be already associated with another radio device not connected to the bus. This means that, by connecting them all to one and the same bus, all the devices belonging to several distinct groups of associated radio devices can be associated in one and the same group. In fact, as for the association of two radio devices, following a reinitialization of the bus to which all the radio devices to be associated are connected, each radio device explores the bus. The process for one of them will be considered. If it finds no other radio device on the wired network (30), it retains its former association (35) and abandons the process of association. Optionally, if it finds another device that is not a radio device, then it retains its former association and abandons the process of association. If it finds other radio devices on the bus, then it tries wireless communication with its former associates except those that are already on the bus (31). If it succeeds in this, then its retains its former associations and abandons the process of association. Before pursuing the association, the radio devices can wait for a non-mandatory human intervention (32). If it does not succeed in entering into contact with any of its former associates, it then begins the protocol of association. Over the wired network, it requests their EUI-64 addresses from the connected radio devices and a response indicating for each other radio device whether that radio device has succeeded in communicating with at least one of its former associates. The radio device in question receives all the responses (33) and associates itself with each radio device that has sent a response indicating that it has not succeeded, by entering their EUI-64 (34) addresses into a modifiable memory.

This first variant of the extension of the present invention to more than two devices can therefore be used to associate several radio devices with one another by connecting them all to one and the same bus. This enables the subsequent formation of bridges between several buses by means of the portals which these radio devices are. This association is simple and is used to associate simultaneously a large number of radio devices. To realize this association, it is necessary however to be able to connect all the radio devices to be associated to one and the same bus, which is not always possible. In effect, radio devices currently in use must not be disconnected from their bus. On the other hand, radio devices are required which do not possess valid associations other than those existing with radio devices connected to the bus, that is that they cannot communicate without contact with any of their associates not situated on the bus.

Figure 5A:
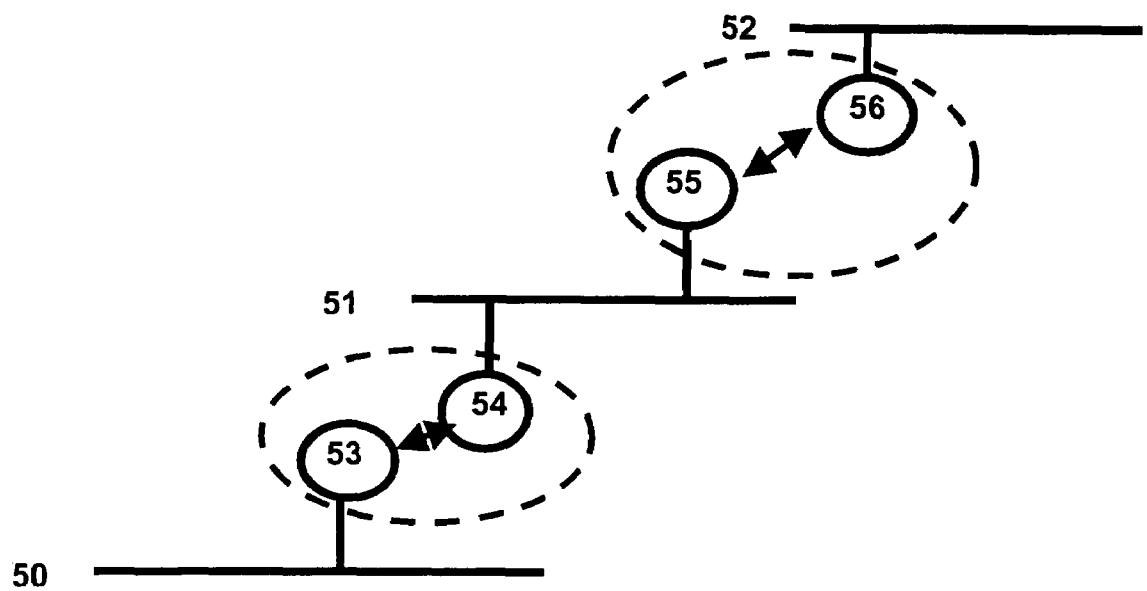
FIGS. 5*a* and 5*b* are representations of several buses linked by radio bridges.
Figure 5B:
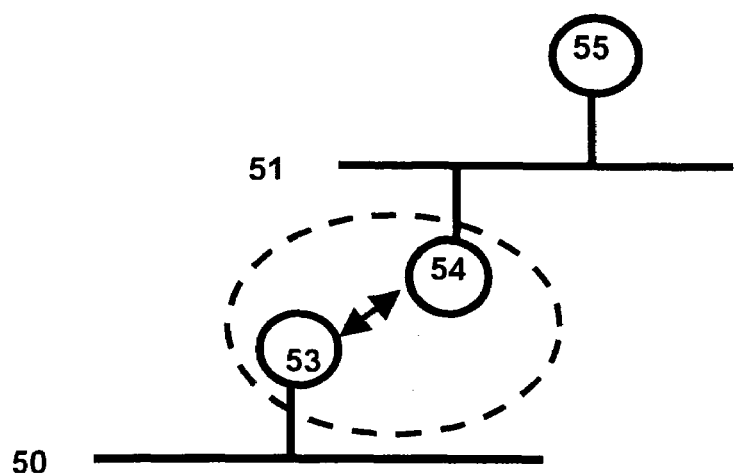

The second variant is thus used to add under certain conditions a new radio device to a set of radio devices already associated with one another. The radio device to be added and one of the radio devices of the previous set are to be connected to one and the same bus, which can be the bus to which the radio device already associated with a set of radio devices was already connected. The addition of a new radio device on the bus provokes the reinitialization of the bus (bus reset) and therefore the procedure of exploration of the bus by the devices that are connected to it. Consideration is given to the method of exploration for any one of the radio devices. If it does not find any other radio device connected to the bus (40), it retains its former association (46) and abandons the process of association. If it finds more than one (41), it then also retains its former association. If it finds only one other radio device, then it tries wireless communication with its former associates (42). If it succeeds, then it continues the protocol of association but memorizes internally the fact that it has succeeded in wireless communication with at least one of its former associates. To begin the protocol of association, the radio devices wait for a human action (43) which is in this case mandatory. The human intervention is here mandatory because it can indeed be imagined, as in FIG. 5*a*, that two radio devices (54 and 55) are connected to one and the same bus (51) so that this bus can be linked to two other buses (50 and 52) via two radio bridges formed by the associations 53-54 and 55-56. If the bus 52 is deleted as in FIG. 5*b*, the two radio devices 54 and 55 must not associate because otherwise they would form a loop. The human intervention is therefore mandatory in this case. If all the preceding conditions are fulfilled and the association has been enabled by a human intervention, then the two radio devices connected to the bus begin the protocol of association via the bus: if the two radio devices still have at least one valid association (44), then they both retain their former associations. If at least one of the two radio devices has no valid association (44), then it associates itself (45) with the other radio device and with all its associates and vice versa.

This second variant therefore is for associating a radio device with a set of radio devices that already exists and this process means that all the radio devices used do not have to be disconnected in order to connect them to the same bus. It is sufficient to connect the radio device to be added to one of the buses comprising another radio device in order to be able to associate it with the set of radio devices that are already present.

Figure 6:
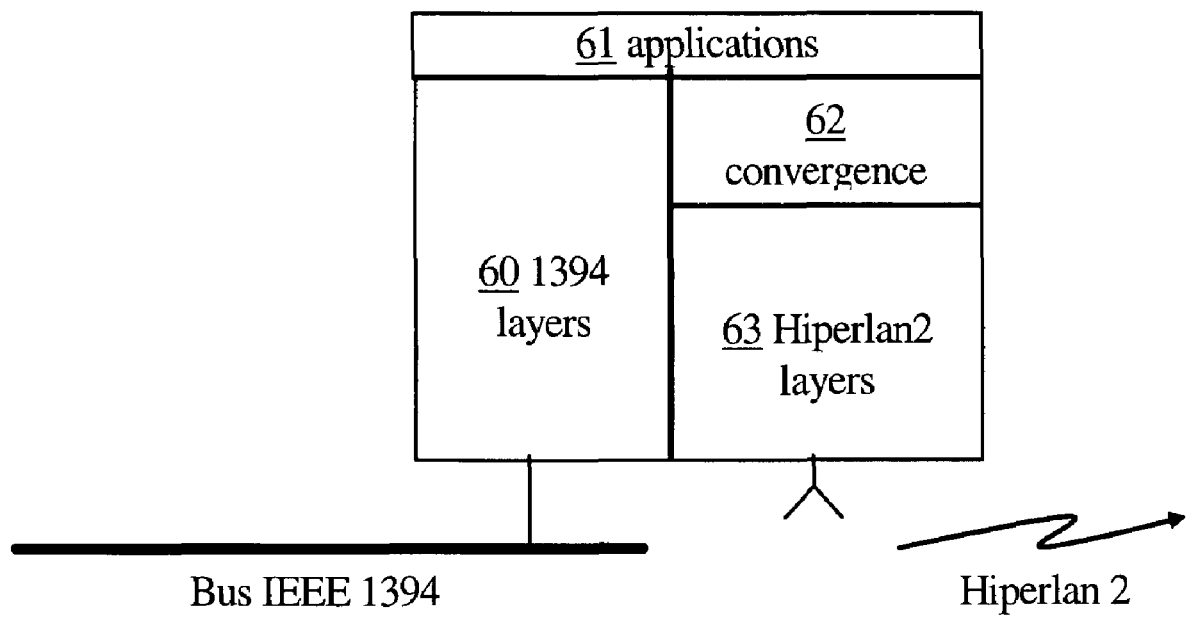
FIG. 6 is a general diagram of a radio device and of its various parts.

FIG. 6 presents the general software organization of a radio device. It comprises a part 60 similar to that of all the devices capable of being connected to a 1394 bus, a layer 61 comprising the various applications, particularly those managing the method of association, a layer 62 of convergence between the 1394 and Hiperlan 2 networks and finally a layer 63 specific to the communications via Hiperlan 2.

Figure 7:
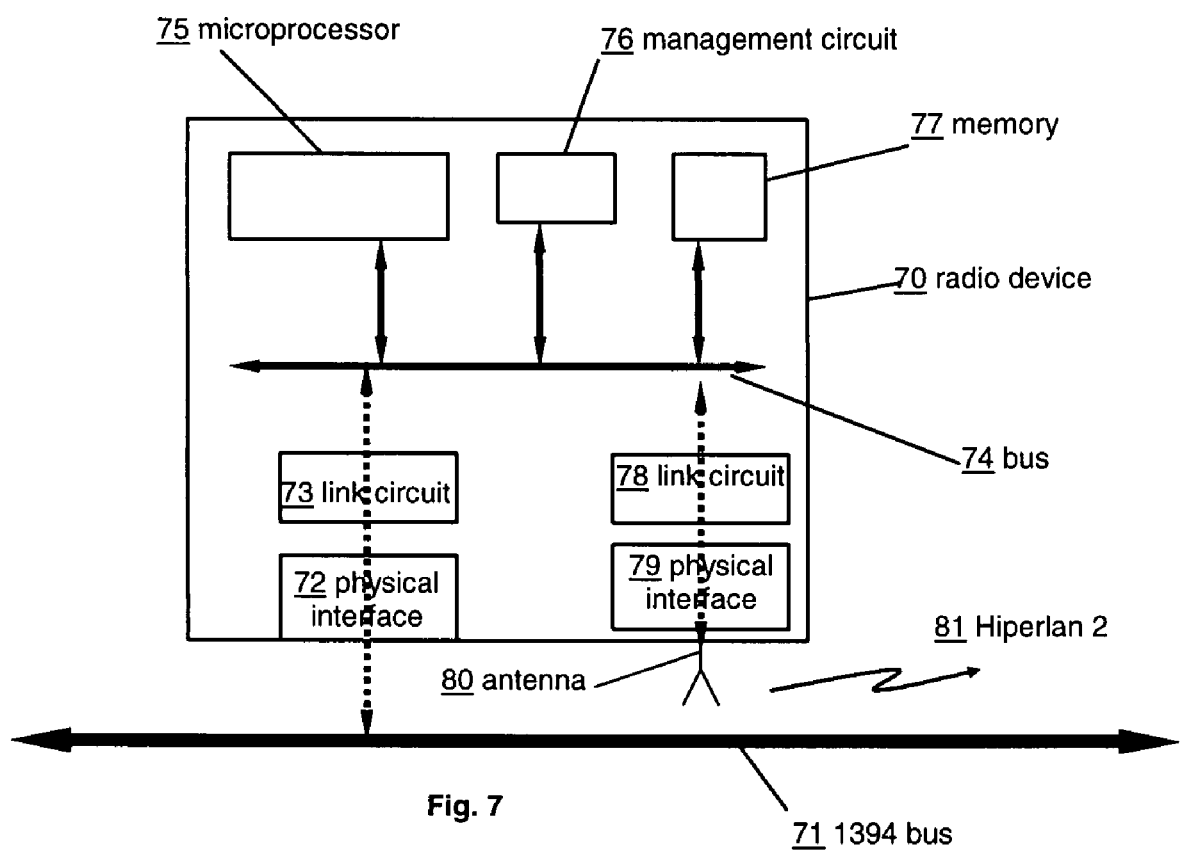
FIG. 7 is a block diagram of a radio device.

FIG. 7 is a block diagram of a radio device 70. The radio device 70 is connected to the 1394 serial bus bearing the reference 71 over a physical interface 72 and a link circuit 73. This latter is linked to the internal parallel bus 74 of the radio device 70. A microprocessor 75 manages the radio device which also comprises an input/output management circuit 76 as well as a memory 77. These last three elements are also linked to the parallel bus 74. The radio device 70 also comprises another link circuit 78 and a physical interface 79 enabling it to be connected to the Hiperlan 2 network (81) via an antenna 80.

Typically, the microprocessor takes charge of implementing the method of association, that is the steps of exploration of the network and the steps of communication via the wired network 70 and Hiperlan 2 radio network. The information on the radio devices present after a reinitialization is memorized for example in the re-writeable memory 77.

It is fully understood that modifications may be made to the method in respect of its implementation without them departing from the scope, as defined by the claims, of the present invention.

The invention claimed is:

1. A method of associating communication devices capable of wireless communication, the association for subsequent mutual recognition of the associated communication devices for implementing a wireless communication between the associated devices, a communication device being able to communicate wirelessly with another communication device designated as its associate, the method comprising:

verifying, by the communication device, the presence of communication devices capable of wireless dialog connected to a wired network; and memorizing, by the communication device, identifiers of the verified communication devices capable of wireless dialog connected to the wired network, thereby establishing an association being adapted for subsequent mutual recognition for wireless communication with the communication devices whose identifiers are memorized.

2. The method of claim 1, wherein a current association of a communication device to another communication device is modifiable by connecting the communication device to a unique wired network having at least one other wireless communication device to be associated.

3. The method as claimed in claim 1, wherein the step of verifying is performed at the time of a connection of a device to the wired network.

4. The method as claimed in claim 3, wherein a communication device can have only one associate at a time.

5. The method as claimed in claim 4, wherein the association method is abandoned if, at the time of the verification step, the communication device ascertains that more than one other communication device capable of wireless dialog is connected to the wired network.

6. The method as claimed in claim 5, further comprising attempting wireless communication with the communication device's former associate which is used to abandon the method if, during this step, the communication device achieves wireless communication with its former associate, where the former associate and the communication device are not physically linked.

7. The method as claimed in claim 3, wherein a communication device has a plurality of associates at a time.

8. The method as claimed in claim 7, further comprising attempting wireless communication with former associates which is used to abandon the method if, during this step, the communication device achieves wireless communication with at least one former associate, where the at least one former associate and the communication device are not physically linked.

9. The method as claimed in claim 3, wherein the association method is abandoned if, at the time of the verification step, a communication device ascertains that other units, different from a communication device capable of wireless dialog, are connected to the wired network.

10. The method as claimed in claim 7, further comprising creating a physical link between a communication device and only one other of the devices with which it can associate, which causes a phase of configuration or of reconfiguration of the wired network respectively created or modified.

11. The method as claimed in claim 1, wherein the association method is abandoned it at the time of the verification step, the communication device ascertains that more than one other communication device capable of wireless dialog are connected to the wired network.

12. The method as claimed in claim 11, wherein only one of the communication devices capable of dialog without contact connected to the network must be able to succeed in communicating without contact with its former associates.

13. The method as claimed in claim 12, wherein, during the memorization phase, each communication device is associated not only with the other communication device present on the network but also with all its associates.

14. The method as claimed in claim 1, further comprising validating by a user of the association to be achieved by the method.

15. The method as claimed in claim 1, wherein the wired network used is of an IEEE 1394 type.

16. The method as claimed in claim 1, wherein a unique and permanent identifier of a communication device is an EUI-64 address.

17. The method as claimed in claim 1, wherein a wireless communication network is of a Hiperlan 2 type.

18. A communication device capable of wireless dialog comprising:
  means of wireless communication with other communication devices capable of wireless dialog and designated as being an associate of the communication device;
  means for connecting to a wired network;
  means for communicating with devices connected to the wired network;
  means for detecting, on the wired network, other communication devices capable of wireless dialog; and
  means for memorizing identifiers of the other communication devices capable of wireless dialog detected by the detecting means, thereby establishing an association with the other communication devices capable of wireless dialog.

19. The communication device of claim 18, wherein a current association of the communication device to another communication device is modifiable by connecting the communication device to a unique wired network having at least one other wireless communication device to be associated.

* * * * *